(No Model.)

W. H. SMITH.
NUT LOCK.

No. 356,170. Patented Jan. 18, 1887.

Witnesses:
C. M. Stiles.
R. H. Orwig.

Inventor:
William H. Smith,
By Thomas G. Orwig, Atty.

UNITED STATES PATENT OFFICE.

WILLIAM HOCKEN SMITH, OF DE SOTO, IOWA.

NUT-LOCK.

SPECIFICATION forming part of Letters Patent No. 356,170, dated January 18, 1887.

Application filed June 9, 1886. Serial No. 204,602. (No model.)

*To all whom it may concern:*

Be it known that I, WILLIAM HOCKEN SMITH, a citizen of the United States of America, and a resident of De Soto, in the county of Dallas and State of Iowa, have invented a new and useful Improvement in Nut-Locks for Railway-Rail Joints, of which the following is a specification.

My object is to prevent the dangers and accidents incident to railway travel that are occasioned by the turning of nuts in rail-joints until the joints become loose and the track unsafe; and my invention consists in the construction and combination of detachable nut-clasps and a clasp-support with the abutting ends of two rails and two fish-plates, as hereinafter set forth, pointed out in the claims, and illustrated in the accompanying drawings, in which—

Figure 1:
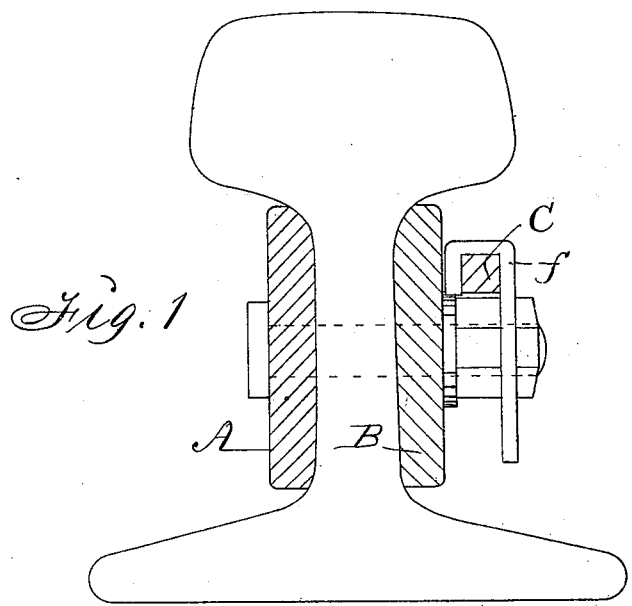
Figure 2:
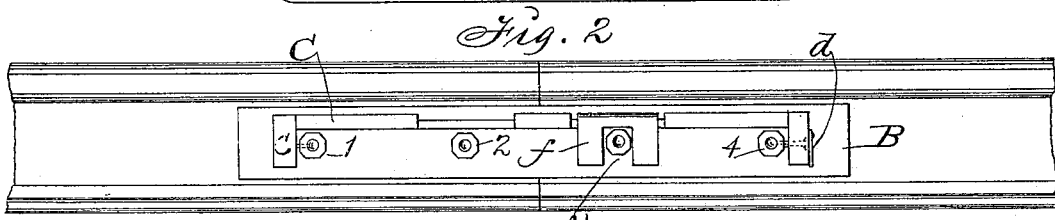
Figure 3:
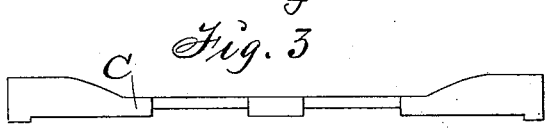
Figure 4:
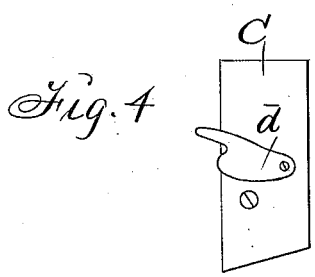

Figure 1 is a transverse section of a rail-joint having my nut-lock attached. Fig. 2 is a side view of a joint from which one of the nut-clasps has been removed. Fig. 3 is a top view of the clasp-support. Fig. 4 is an end view of the same support, which shows a screw-cover pivoted thereto.

A and B represent fish-plates of common form clamped to the opposite sides of the webs of the abutting ends of two rails by means of screw-bolts.

C is my clasp-support, that has its ends extending downward at right angles and adapted to slip over the nuts on the bolts that are nearest the ends of the fish-plates. These ends fit flat against the fish-plates, and the central portion of the support is cut away, to allow clasps to be slipped upon it to lock the nuts on the bolts nearest the ends of the rails.

1 2 3 4 are elongated six-sided nuts on the ends of the bolts, that are passed through the fish-plates and the webs of the rails in a common way. A dowel-pin carried on one of the vertical end portions of the clasp-support C enters a perforation in the contiguous nut to lock that nut, a screw passed through a perforation in the opposite end of the support engages the adjoining nut, and a pivoted cover, $d$, on the end of the support, in its normal condition, conceals the head of the screw and prevents its escape, and thus the clasp-support and two nuts are locked together.

$f$ are nut-clasps composed of flat plates bent into hook shape and provided with central angular openings, $f'$, in such a manner that they can be readily hung upon the central portion of the support C, to stride and lock the two central nuts, so that all the nuts and the support will be jointly locked together by the application of my complete device, as required to retain the nuts in their places on the bolts and the fish-plates firmly clamped to the rails and the joint and track solid and safe.

I claim as my invention—

1. The combination of the clasp-support C, having vertical extensions at its ends, a dowel-pin in one of said vertical ends and a screw in the other, with two hook-shaped clasps, two nuts, two bolts, two fish-plates, and the abutting ends of two rails, substantially as shown and described, for the purposes stated.

2. The improved nut-lock for railway-joints, consisting of the clasp-support C, having vertical extensions at its ends and pins or screws in said ends, and detachable clasps $f$ $f'$, substantially as shown and described.

WILLIAM HOCKEN SMITH.

Witnesses:
 Z. S. WHALEY,
 G. W. LEONARD.